C. Sussner,
Water Filter,
N° 40,369.    Patented Oct. 20, 1863.
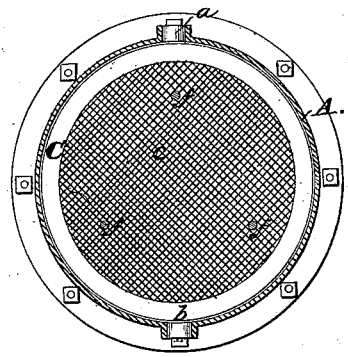
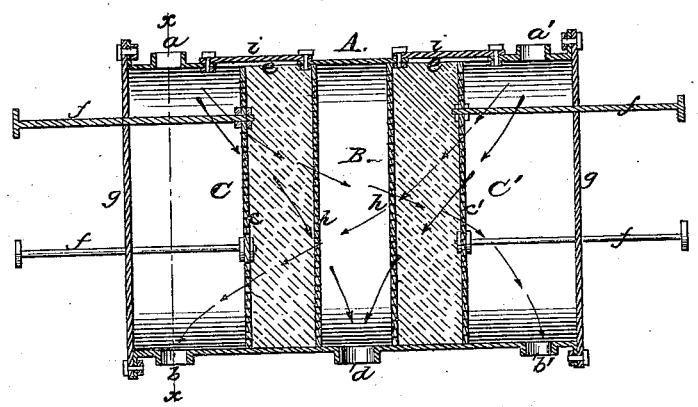
Witnesses:    Inventor.
Francis Gould.    Charles Sussner
J. B. Crosby

UNITED STATES PATENT OFFICE.

CHARLES SÜSSNER, OF THE UNITED STATES.

IMPROVEMENT IN FILTERS.

Specification forming part of Letters Patent No. 40,369, dated October 20, 1863.

*To all whom it may concern:*

Be it known that I, CHARLES SÜSSNER, a citizen of the Kingdom of Great Britain, but at present residing in the United States, have invented an Improved Filtering Apparatus; and I do hereby declare that the following, taken in connection with the drawings which accompany and form part of this specification, is a description of my invention sufficient to enable those skilled in the art to practice it.

This invention relates to the construction of a filtering apparatus for filtering water under pressure, with reference to cleansing the filtering materials and the plates inclosing such materials; and the invention consists in the employment of movable or adjustable diaphragm-plates, and in a peculiar arrangement of the filtering-chambers and inlet and outlet pipes or orifices.

Figure 1 of the accompanying drawings represents a longitudinal central section of my apparatus; Fig. 2, a cross-section taken through the line $x\ x$ of Fig. 1.

A denotes the box or casing containing the filters. This box is divided by partitions $h\ h'$ into a central or outlet chamber or compartment, B, and two filter chambers, C C'. Inlet pipes or orifices $a\ a'$ are placed at or near the opposite ends of the casing A, on one side thereof, and outlet-pipes $b\ b'$ lead from the opposite side thereof. An outlet-pipe, $d$, leads also from the central chamber, B. Between the orifices $a\ b$ and the cross-plate $h$ a cross plate or diaphragm, $c$, is placed, said diaphragm being so fitted to or packed in the chamber as to be capable of movement toward and away from the plate $h$. The plates $c\ c'$ and $h\ h'$ are made with perforations or strainers to allow the water to percolate through them and through the filtering medium placed between them. Rods or screws $ff$ are fastened to the diaphragm $c$, and extend through the end plate, $g$, of the box A, so that by sliding or turning the rods the diaphragm $c$ can be moved. A plate, $c'$, actuated by rods $f$, is similarly applied to the other end of the box A. Between the plates $c$ and $h$ and the plates $c'\ h'$ the material used for filtering is placed, it being held and packed between the plates by pressure of the diaphragms $c$ and $c'$. Man-holes $e\ e'$ are placed at the top of each filter-chamber, covers $i\ i$ fitting upon and closing the same.

The operation of the apparatus is as follows: The water entering through the pipes $a\ a'$ passes through the plates $c\ c'$, filtering chambers C C, and plates $h\ h'$ into the outlet-chamber B, and thence is drawn off or delivered through the eduction-pipe $d$, the pipes $b\ b'$ being, of course, closed. The direction of the water in this process is shown by the arrows in red in Fig. 1. If necessary or advisable to still further filter the water after passing through the filtering material in the chamber C, the pipes $a'$ and $d$ may be closed and the pipe $b$ opened, when the water, after passing through the chamber C into the chamber B, will still further pass through plate $h'$, filtering-chamber C', diaphragm $c$, and out at orifice $b$, having been thus filtered through both chambers C and C'. If we wish to draw the water unfiltered, or to have it run with full head unobstructed by the plates and filtering material, the opposite pipes $a\ b$ and $a'\ b'$ are opened, when the water will run directly through without obstruction.

To remove impurities which collect on the outer surfaces of the diaphragm-plates, I proceed as follows: To clean the plate $c$, I close pipes, $a$, $d$ and $b'$ and open pipes $a'$ and $b$. The water will then pass through plates $c'$ and $h'$ and filter-chamber C' into chamber B, and thence, having been cleansed from its impurities, it passes through plate $h$ and filter-chamber C, through plate $c$, and out at $b$, its passage through $c$ being in the opposite direction to that it had before, and so as to detach all extraneous or foreign matters which have been deposited upon the surface of the plate $c$. The plate $c'$ is cleansed in a similar manner, as will be readily understood. The arrows in black, Fig. 2, show the direction of the water in cleansing the plates, or in passing through both filters for double filtration. Two purposes are gained by causing the water to pass through both filters, as described, for the purpose of cleansing the diaphragms $c\ c'$. In the first place, as the water reaches the chamber B it has been filtered to such extent as not to leave deposits on the surface of the plate $h$, which deposits, if there made, would be drawn off in the regular operation of the apparatus through the regular eduction-pipe $d$; and, secondly, the water is of course in a much purer and better condition to detach the impurities from the diaphragm $c$ than if it had gone through but the filter C.

Filters have been before made so as to reverse the currents to cleanse the filter-plates, and one wherein a filtering-chamber, similar to the chamber C, had orifices, as at $a$ $b$, on one side thereof, and similar orifices on the other side thereof, so that after the upper orifice on one side and the lower one on the opposite have been opened for a time (the water passing through the filter) they are closed and the other two opened, when the deposit or collection of foreign matter impinging against or adhering to the previous acting or straining face of the filter will be detached and washed out through the eduction-orifice. This is objectionable, because the impurities are drawn off through the common eduction-pipe, whereas with my arrangement the pipe $d$ never delivers any but the cleansed water, while the arrangement also possesses the further advantage, before alluded to, of doubly cleansing the water before it reaches the plate from which the impurities are to be detached, and also allows of double or single filtration of the water for use at will.

Having thus described the method of filtering the water and of cleansing the plates, I will now explain how I cleanse the material in the filtering-chambers. This I do by drawing out the rods $f$ and diaphragms $c$ $c'$, thereby loosening the material, and then driving the water through the chambers, the force of the current serving to agitate the particles and to thoroughly wash them. If the current or head is not strong enough, I remove the covers of the man-holes $e$ $e'$, and agitate or stir up the grains composing the filtering material, so as to bring them into action with the current. The covers being then replaced, the movable diaphragms are forced up against and so as to pack the filtering material, and the apparatus is again ready for use. Thus it will be seen that the apparatus affords an easy and ready means for cleansing both the material and the plates, and possesses other advantages, as set forth.

I claim—

1. The arrangement of the two filters or filtering-chambers C C' with reference to the inlet and outlet pipes extending therefrom and to the chamber B, and its outlet-pipe $d$, in the manner and for the purpose substantially as set forth.

2. The movable diaphragms $c$ $c'$, made to slide in the filtering-chamber for packing or loosening the filtering material, substantially as described.

CHARLES SÜSSNER.

Witnesses:
J. B. CROSBY,
FRANCIS GOULD.